(12) United States Patent
Bonte et al.

(10) Patent No.: US 9,879,735 B2
(45) Date of Patent: Jan. 30, 2018

(54) SHEAR PIN

(71) Applicant: CNH Industrial America LLC, New Holland, PA (US)

(72) Inventors: Xavier G. J. M. Bonte, Et Sint Kruis (NL); Peter Vanhoutte, Versenare (BE)

(73) Assignee: CNH Industrial America LLC, New Holland, PA (US)

( * ) Notice: Subject to any disclaimer, the term of this patent is extended or adjusted under 35 U.S.C. 154(b) by 184 days.

(21) Appl. No.: 14/439,862

(22) PCT Filed: Oct. 29, 2013

(86) PCT No.: PCT/EP2013/072598
§ 371 (c)(1),
(2) Date: Apr. 30, 2015

(87) PCT Pub. No.: WO2014/067939
PCT Pub. Date: May 8, 2014

(65) Prior Publication Data
US 2015/0300416 A1 Oct. 22, 2015

(30) Foreign Application Priority Data

Oct. 30, 2012 (BE) .................................. 2012/0755

(51) Int. Cl.
*A01F 15/08* (2006.01)
*A01F 21/00* (2006.01)
(Continued)

(52) U.S. Cl.
CPC .............. *F16D 9/06* (2013.01); *A01B 61/025* (2013.01); *A01D 75/18* (2013.01); *A01D 75/182* (2013.01);
(Continued)

(58) Field of Classification Search
CPC ..... A01F 15/0841; A01F 21/00; A01D 75/18; A01D 75/182; A01B 61/025; F16D 9/06;
(Continued)

(56) References Cited

U.S. PATENT DOCUMENTS 2,641,116 A * 6/1953 Russell ............... A01F 15/0841
100/282
2,665,631 A * 1/1954 Paul .................... A01F 15/0841
100/179
(Continued)

FOREIGN PATENT DOCUMENTS

DE 2348784 A1 4/1974

*Primary Examiner* — Jimmy T Nguyen
(74) *Attorney, Agent, or Firm* — Peter K. Zacharias; Patrick M. Sheldrake

(57) ABSTRACT

An Agricultural baler having a flywheel that is driven via a drive shaft. The flywheel is connected to a pressing component of the baler via a central shaft, wherein the flywheel is mounted over the central shaft via bearings. Further mounted on the central shaft is a shear pin flange which is connected via a shear pin to the flywheel for the purpose of transmitting a rotation movement of the flywheel to the central shaft, wherein the flywheel is held over the central shaft via first fixing component and wherein the shear pin flange is connected to the central shaft via second fixing component.

7 Claims, 2 Drawing Sheets

(51) Int. Cl.
  *A01D 75/18* (2006.01)
  *F16D 9/06* (2006.01)
  *H02K 7/02* (2006.01)
  *A01B 61/02* (2006.01)

(52) U.S. Cl.
  CPC .......... *A01F 15/0841* (2013.01); *A01F 21/00* (2013.01); *H02K 7/025* (2013.01); *Y10T 74/2121* (2015.01)

(58) Field of Classification Search
  CPC ...... H02K 7/02; H02K 7/025; Y10T 74/2121; Y10T 74/2117; Y10T 74/2119; Y10T 74/2126
  See application file for complete search history.

(56) References Cited

U.S. PATENT DOCUMENTS

| | | | |
|---|---|---|---|
| 2,685,804 A * | 8/1954 | Raney | A01F 15/0841 100/282 |
| 2,862,347 A | 12/1958 | Nelson | |
| 2,948,101 A * | 8/1960 | Long | A01F 15/101 100/142 |
| 4,241,654 A | 12/1980 | Van Der Lely | |
| 4,254,668 A * | 3/1981 | Kessinger | B60K 6/105 74/572.2 |
| 4,615,238 A | 10/1986 | Cheatum | |
| 7,293,543 B1 * | 11/2007 | Scekic | F16H 1/10 123/198 R |
| 2011/0031827 A1 * | 2/2011 | Gennesseaux | H02K 7/025 310/74 |
| 2012/0186463 A1 * | 7/2012 | Vergote | A01F 15/101 100/3 |

* cited by examiner

SHEAR PIN

This application is the US National Stage filing of International Application Serial No. PCT/EP2013/072598 filed on Oct. 29, 2013 which claims priority to Belgian Application BE2012/0755 filed Oct. 30, 2012, each of which is incorporated herein by reference in its entirety.

TECHNICAL FIELD

The invention relates to an agricultural baler. Agricultural balers are typically pulled and driven by a tractor or similar agricultural machine.

PRIOR ART

The baler is typically provided with a flywheel. This flywheel is placed between the drive shaft (which is driven by the tractor) and the central shaft (which runs to the pressing means of the baler) in order to absorb variations in force. A baler is typically provided with a plunger which moves reciprocally in a baling chamber in order to there compress crops such as straw and hay or the like. Because the plunger moves reciprocally, the force used by the baler to press the bales via the plunger is not constant over time. The force required to press the bales is transmitted pulse-wise from the drive. The flywheel is provided for the purpose of forming a buffer between on the one hand the drive of the tractor (wherein a substantially constant force is produced over time) and on the other the pulse-wise force transmission to the pressing means (which displays large fluctuations over time).

In known balers the flywheel is mounted over the central shaft and is held in place by a shear pin flange. The shear pin flange is connected via a spline connection to the central shaft and connected via a shear pin to the flywheel. The flywheel is mounted on the central shaft via bearings. The shear pin thereby forms the connection between the flywheel and the central shaft, and the transmission of force from the flywheel to the central shaft runs via the shear pin. The shear pin thus forms a protection for the pressing means. The pressing means often comprise a gearbox which can bear a maximum force. The shear pin is dimensioned such that the pin breaks when this determined force is exceeded. The gearbox is thus prevented from breaking due to overload.

A drawback of this arrangement is that the shear pin flange has to be mounted against the bearings of the flywheel with a predetermined force and very precisely in order to avoid clearance on the flywheel and also enable a rotation of the flywheel relative to the shear pin flange (when the pin breaks). The optimal distance between flywheel and shear pin flange is hereby 0.1 mm. The shear pin flange is however pulled against the flywheel at the position of the shear pin, while the intermediate distance of 0.1 mm is maintained at the opposite end. This not only causes a shearing force on the shear pin (which is ideal) but also a bending force which causes extra fatigue to the shear pin. A further drawback of this arrangement is that the intermediate distance between flywheel and shear pin flange allows retraction of the shear pin between the flywheel and the shear pin flange due to deformation which typically occurs just before breaking. When the pin then breaks, the pin parts may become jammed in the respective openings in the shear pin flange and the flywheel. The pieces of the broken pin are hereby difficult to remove, and pieces of the pin may remain between the flywheel and the shear pin flange, thereby causing damage. This construction of flywheel, shear pin and shear pin flange results in extra fatigue of the shear pin in that forces other than the pure shearing force are exerted on the shear pin, and is therefore not optimal.

SUMMARY

It is an object of the invention to provide an agricultural baler in which the shear pin is more optimally loaded.

The invention hereby provides an agricultural baler with a flywheel provided to be driven via a drive shaft, which flywheel is further connected to pressing means of the baler via a central shaft, wherein the flywheel is mounted over the central shaft via intermediate bearings, wherein further mounted on the central shaft is a shear pin flange which is connected via a shear pin to the flywheel for the purpose of transmitting a rotation movement of the flywheel to the central shaft via the shear pin and shear pin flange, characterized in that the flywheel is held over the central shaft via first fixing means and wherein the shear pin flange is connected to the central shaft via second fixing means differing from the first fixing means.

The use of different fixing means to hold the flywheel and to hold a shear pin flange has the result that the relative position of shear pin flange and flywheel can be freely determined, as each of the flywheel and the shear pin flange are mounted on/over the shaft via different fixing elements. This at least greatly reduces the drawbacks of the existing agricultural balers. Fixing of the shear pin flange via fixing means differing from the fixing means for mounting the flywheel over the central shaft enables free positioning of the shear pin and the shearing plane such that only shearing forces are exerted on the shear pin when a rotation movement is transmitted from the flywheel to the central shaft. Bending forces and other torques on the shear pin can be avoided due to the independent mounting. Nor is it any longer necessary to regulate and control the clearance between flywheel and shear pin flange, between which material of the shear pin can flow. This creates a better defined shearing plane, whereby the shear pin will operate in more optimal manner. Because the shear pin undergoes fewer bending forces and torques and because the shearing plane is better defined, the shear pin will be less fatigued and thereby be able to operate optimally for longer without breaking.

The central shaft is preferably connected to the shear pin flange via a spline connection. A spline connection allows transmission of a torque to the central shaft via the shear pin flange. The flywheel can hereby drive the shear pin flange via the shear pin, which shear pin flange then in turn transmits forces to the central shaft via the spline connection.

The flywheel is preferably positioned on the central shaft between on the one hand a stop provided on the shaft and on the other a nut which engages on the shaft for the purpose of forming a further stop. The flywheel is hereby positioned and secured over the central shaft between two stops, one which is provided fixedly on the shaft and another which is formed by a nut engaging on the shaft. Via the nut the flywheel can be clamped via the bearings and be assembled and/or disassembled.

The shear pin flange preferably has a central opening with an edge which has teeth and/or grooves in order to thus be connected via a spline connection to the central shaft, and which has a further eccentrically placed opening for mounting of the shear pin. Such a shear pin flange is provided to slide over the central shaft via the central opening and to engage via the teeth and/or grooves on the central shaft in order to thus be able to transmit a torque to the central shaft. The eccentrically placed opening allows mounting of a shear pin which can further be connected to the flywheel such that a force can be exerted on the shear pin flange via the shear pin which results in a torque on the central shaft. Due to its eccentric placing, the position of the shear pin thus forms a lever for driving the central shaft via the flywheel.

The teeth and grooves of the spline connection preferably extend in the axial direction of the central shaft so as to thus allow a movement of the shear pin flange in the axial direction relative to the central shaft. The spline connection with teeth and grooves extending in the axial direction allows a movement of the shear pin flange in the axial direction relative to the central shaft. This movement imparts a freedom in the positioning of the shear pin flange relative to the flywheel in order to thus optimize the shear pin connection. The shear pin flange can thus be pulled against the flywheel via the shear pin in the mounted position so that a well-defined shearing plane is created between the flywheel and the shear pin flange. When the pin breaks, the shear pin flange can move in the axial direction away from the flywheel so as to thus enable a rotation of the flywheel relative to the shear pin flange. This prevents or at least greatly reduces wear of the flywheel and/or the shear pin flange as a result of the breaking of the shear pin. This is because the shear pin flange will move away from the flywheel at the moment the pin breaks, whereby the shear pin flange does not touch the flywheel, or hardly so, when the flywheel rotates relative to the shear pin flange.

The second fixing means preferably allow a clearance in the axial direction between the shear pin flange and the central shaft. The second fixing means prevent the shear pin flange moving from its place but still give the shear pin flange some room to move. The shear pin flange can hereby be pulled against the flywheel by the shear pin and, when the shear pin breaks, the shear pin flange can move away from the flywheel owing to the clearance imparted by the second fixing means.

The shear pin flange preferably has a contact surface provided for the purpose of lying against a surface of the flywheel such that in the assembled position the contact surface lies perpendicularly of the central shaft. Due to the placing of the contact surface perpendicularly of the central shaft the shear pin is under pure shear load. Shear pin material is in this way also prevented from being able to flow between the flywheel and the shear pin flange during the process of the pin breaking.

The contact surface preferably lies in line with the centre of the engagement zone between shear pin flange and central shaft. The engagement zone between shear pin flange and central shaft is defined by the spline connection. The length of the teeth and/or grooves on the shear pin flange will in practice determine the size of the engagement zone. In such a situation the centre of the engagement zone will also lie at the location of the centre of the teeth and/or grooves of the shear pin flange. When the contact surface between shear pin flange and flywheel lies in line with the centre of the engagement zone between shear pin flange and central shaft, a balanced transmission of the torque from the shear pin flange to the central shaft is obtained. This avoids torques on the shear pin flange around a shaft other than the central shaft, which would be the result of an unbalanced transmission of the moment.

The central shaft is preferably connected via a gearbox to pressing means of the baler, wherein the shear pin is dimensioned so as to prevent overload of the gearbox. The shear pin is dimensioned for this purpose to break when a predetermined force is exceeded. This predetermined force is defined as a force at which the gearbox is at risk. Exerting a force greater than the predetermined risk force on the gearbox can cause breakage in the gearbox. The shear pin hereby prevents overload of the gearbox.

The drive shaft preferably comprises a slip clutch for driving the flywheel. The slip clutch is provided for the purpose of slipping when the torque from the drive shaft to the flywheel exceeds a set value. The slip clutch hereby forms a safety for the drive mechanism of the tractor.

BRIEF DESCRIPTION OF THE FIGURES

The accompanying drawings are used to illustrate present non-limitative preferred exemplary embodiments of the present invention. The above stated and other advantages, features and objectives of the invention will become more apparent, and the invention better understood, from the following detailed description when read in combination with the accompanying drawings, in which.

The same or similar elements are designated in the drawing with the same reference numerals.

Figure 1:
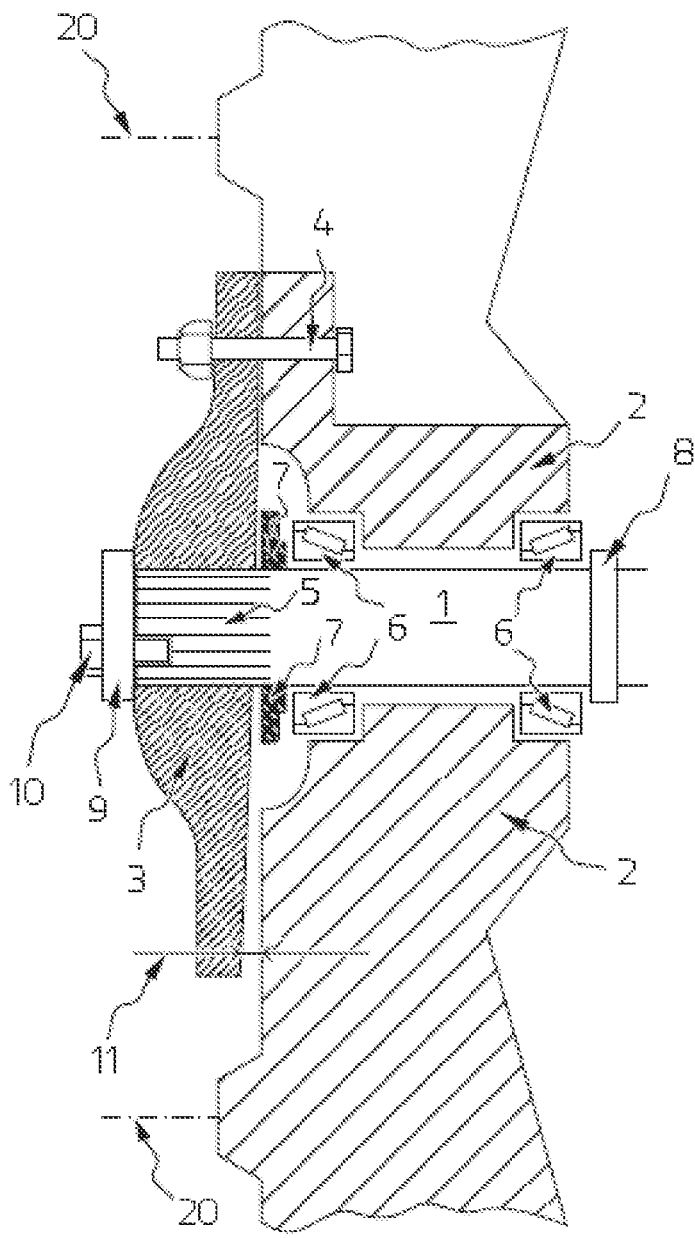
FIG. 1 shows a prior art drive mechanism for an agricultural baler.

The present invention relates to an agricultural baler. An agricultural baler is an agricultural machine which is typically pulled by a tractor. The agricultural baler is further typically driven by the tractor. At the position of the connection to the baler the tractor has a shaft which is driven by the motor of the tractor and via which shaft the pressing means of the baler are driven.

The agricultural baler typically comprises a baling chamber defined by baling chamber walls. At least one of the baling chamber walls is movable here such that the inner diameter of the baling chamber can be varied. Varying the diameter of the baling chamber can influence the force necessary to press the bale. This makes it possible to influence the density of the bales and to make allowance for different crops such as hay, straw or other crops, or changing crop conditions such as the moisture content of the crop, the degree of damage, the amount of contamination present in the crop and so on.

Typically placed on the front side of the baling chamber is a plunger which moves reciprocally in order to thus compress the crop material in the chamber so as to form the bale. Also formed is a pre-pressing chamber which is connected to the baling chamber. Crop material is collected in the pre-pressing chamber and a disc of crop material is formed. This disc is carried into the baling chamber via a stuffer. The plunger is configured to compress the introduced discs of crop material in the baling chamber in order to thus form a bale with successive discs.

The movement of the baling chamber walls, the plunger, the stuffer and other moving parts of the agricultural baler are driven from a central drive mechanism. This drive mechanism is typically connected to the output shaft of the tractor in order to be driven by the tractor.

The tractor typically produces a constant output force. That is, the rotation speed of the output shaft of the tractor is preferably substantially constant and the power provided by this output shaft is preferably as constant as possible. The pressing means of the baler are provided so as to compress the crop material pulse-wise in the baling chamber. A great deal of energy consumed particularly when the plunger performs a positive return operating stroke (relative to the travel direction), while little energy is consumed when the plunger makes a forward movement. A flywheel is provided for this purpose between the drive of the tractor and the pressing means of the baler. This flywheel is provided in the drive mechanism. Owing to its high inertia the flywheel will absorb the pulse-wise transmission of force of the pressing means of the baler and equalize it relative to the drive shaft of the tractor. The tractor can thus provide a relatively constant force to the baler, while force is transmitted pulse-wise to the baler. The flywheel serves as coupling between this constant and pulse-wise action of forces.

The pressing means of the baler preferably comprise a gearbox. Gearboxes are typically dimensioned to be able to bear a predetermined maximum force. When this maximum force is exceeded it is not possible to guarantee good operation of the gearbox. Elements of the gearbox will in practice break or tear when the predetermined maximum force is exceeded. Replacing a gearbox or gearbox elements is expensive and time-consuming. It is therefore known to provide a shear pin connection between the drive and the gearbox, wherein the shear pin connection is dimensioned such that the shear pin breaks when the predetermined maximum force is exceeded. A "weakest spot" is in this way formed for the gearbox in order to protect the gearbox from overload. When overload occurs the shear pin will break, so that the force transmission is interrupted. This prevents the predetermined maximum force being exceeded in the gearbox. The shear pin connection thereby forms a safety for the gearbox.

FIG. 1 shows a drive mechanism with shear pin connection for a prior art agricultural baler. FIG. 1 thus shows central shaft 1 which drives the gearbox (not shown) and so drives the further pressing means of the baler. A flywheel 2 is mounted over central shaft 1 via intermediate bearings 6. Fixed against this flywheel 2 is a shear pin flange 3 which is connected via a shear pin 4 to flywheel 2. The shear pin flange 3 is connected via a spline connection 5 to central shaft 1. Central shaft 1 has for this purpose teeth and/or grooves which are complementary to teeth and/or grooves provided in an edge of a central opening of the shear pin flange 3.

Flywheel 2 is driven by a drive shaft (not shown) which engages on the flywheel. Points of engagement 20, to which the drive shaft can be fixed, are provided in the figure. Alternatively, the drive shaft can drive the flywheel via a belt or chain. The drive shaft preferably comprises a slip clutch which slips when the torque from the drive shaft to the flywheel exceeds a set value.

Flywheel 2, which is driven by the drive shaft, is connected to the shear pin flange 3 via shear pin 4, whereby the rotation movement of the flywheel is transmitted directly to the shear pin flange 3. The shear pin flange 3 is in turn connected to central shaft 1 via the spline connection 5, whereby a rotation movement of the shear pin flange is transmitted directly to central shaft 1. Central shaft 1 can thus be driven by flywheel 2 via the shear pin flange 3 and shear pin 4.

Flywheel 2 is mounted over central shaft 1 via bearings 6. It is noted here that bearings 6 will only come into operation when shear pin 4 breaks, since otherwise the flywheel rotates synchronously with central shaft 1.

Central shaft 1 comprises a thickened portion 8 which forms a stop for bearings 6. Bearings 6 of flywheel 2 can strike against thickened portion 8 on one side and are held fast on the other by the shear pin flange 3, optionally via a pinion 7. The shear pin flange is fixed to central shaft 1 via a fixing element 9 which is screwed fixedly with one or more pins 10 into the head of central shaft 1. This arrangement entails a number of problems which are further elucidated below.

During mounting of flywheel 2 and the shear pin flange 3 the flywheel 2 is first pushed with its bearings 6 over its central shaft 1 to a position against its thickened portion 8. A pinion 7 with a reference thickness is then pushed over central shaft 1 against bearings 6, after which the shear pin flange 3 is pushed against flywheel 2 over the teeth and grooves 5. The shear pin flange 3 is then screwed fixedly via fixing element 9 and one or more pins 10, after which the exact intermediate distance 11 between the shear pin flange 3 and flywheel 2 is measured. This intermediate distance 11 is crucial for proper operation of flywheel 2 and the shear pin connection. When the intermediate distance 11 is too great, the flywheel acquires too much clearance so that vibrations may occur and bearings 6 fail. When the intermediate distance 11 is too small, the friction force between flywheel 2 and the shear pin flange 3 will be so great when shear pin 4 breaks that the shear pin flange 3 will still be dragged along with flywheel 2, whereby the shear pin connection loses its function. In practice the optimal intermediate distance is about 0.1 mm. After the dimensions of the intermediate distance 11 have been verified with a reference pinion 7, the optimal thickness of the effective pinion can be determined, and this pinion can be mounted by first removing the shear pin flange, placing the correct pinion 7 and re-mounting the shear pin flange. Shear pin 4 is then placed.

By placing the shear pin 4 the shear pin flange 3 is pulled against flywheel 2 at the position of shear pin 4. Pinion 7 is however chosen so as to create an intermediate distance 11 between the shear pin flange 3 and flywheel 2. As a result the shear pin flange will have an opening on the side opposite shear pin 4, while no opening is present at the position of shear pin 4. This places the shear pin flange 3 in a tensioned position, which results in increased wear of the spline connection 5. This tensioned position of the shear pin flange 3 further results in a bending force on shear pin 4, this bending force forming an extra load on shear pin 4. The intermediate distance between the shear pin flange and flywheel 2 has the further result that, when shear pin 4 breaks, material of the shear pin can flow between the shear pin flange 3 and the flywheel. This is because the shearing plane, which is defined by the space between the shear pin flange 3 and the flywheel, is not well-defined (since it has an opening 11). When pin 4 breaks, it will as a result not be easily possible to remove the pin pieces from the shear pin flange and/or the flywheel. This is highly inconvenient for an operator of the agricultural baler.

Figure 2:
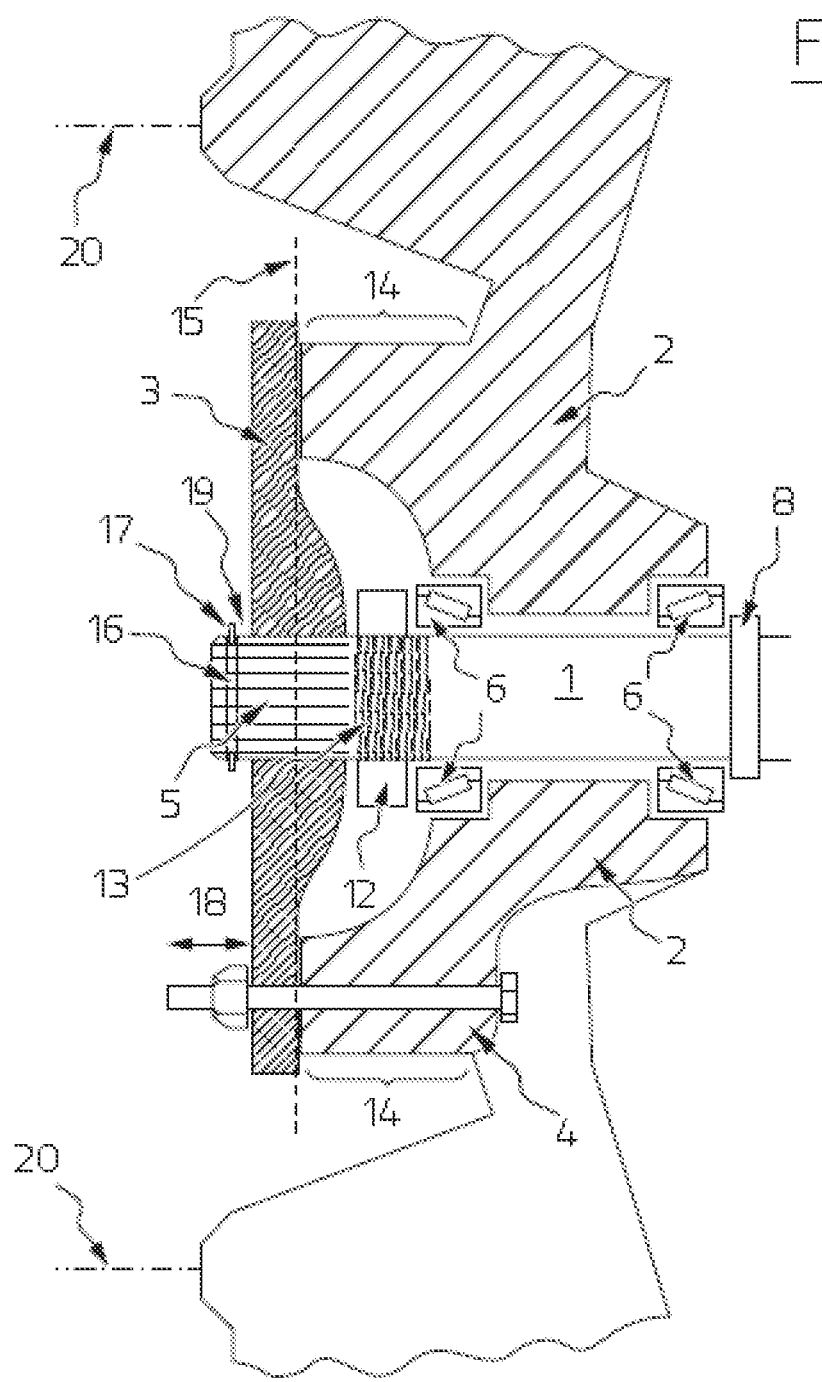
FIG. 2 shows a drive mechanism for an agricultural baler according to an embodiment of the invention.

FIG. 2 shows a flywheel and shear pin connection according to the invention. This FIG. 2 shows many similarities to FIG. 1 and likewise shows a central shaft 1 which runs to a gearbox (not shown) in order to drive pressing means of the agricultural baler. A flywheel 2 is likewise mounted over central shaft 1 via bearings 6. The bearings are however held fast by a nut 12 which is screwed onto the central shaft. This nut 12 hereby forms the fixing means for flywheel 2. The nut preferably engages on screw thread 13 provided on central shaft 1. The figure further shows a shear pin flange 3 which is pushed over a spline connection 5 so as to be thus connected to central shaft 1. The shear pin flange 3 lies against flywheel 2 and is connected to flywheel 2 with a shear pin 4. The shear pin flange 3 is held fast on central shaft 1 by a holding ring 17 which engages in a groove 16 in central shaft 1. The ring-groove connection 16, 17 hereby forms the fixing means for the shear pin flange 3. The shear pin flange 3 is hereby secured on central shaft 1 with first fixing means, while flywheel 2 is secured by second fixing means 12 which differ from the first fixing means 16, 17. The result is a simple assembly of the whole. This is because the intermediate distance between shear pin flange 3 and the flywheel need not be predetermined. During assembly of this arrangement according to the invention the flywheel is first pushed with bearings 6 over central shaft 1 to a position against thickened portion 8, after which nut 12 is fastened onto central shaft 1 via screw thread 13. Flywheel 2 is hereby correctly positioned. Nut 12 can be provided with openings which allow lubrication of bearings 6. Once the flywheel has been secured with nut 12, shear pin flange 3 can be pushed over central shaft 1. Teeth and/or grooves located on the edge of the central opening of the shear pin flange 3 engage here on complementary teeth and/or grooves of central shaft 1. The shear pin flange 3 is pushed against flywheel 2. The teeth and/or grooves of the spline connection between central shaft 1 and the shear pin flange 3 preferably extend in the axial direction of central shaft 1 so that the shear pin flange can move in the axial direction relative to central shaft 1. The shear pin flange 3 is secured relative to central shaft 1 by a holding ring 17 which clamps in a groove 16 of central shaft 1. Holding ring 17 is preferably placed such that a clearance 19 is provided between the shear pin flange 3 and holding ring 17 when the shear pin flange 3 lies against the flywheel. The shear pin flange 3 is pulled against flywheel 2 via a shear pin 4. This creates a contact surface 15 which is defined by the plane of contact between flywheel 2 and the shear pin flange 3. This plane of contact 15 lies perpendicularly of central shaft 1. Because flywheel 2 is secured via nut 12 and because the spline connection 5 allows a movement of the shear pin flange 3 in the axial direction, the shear pin flange 3 can be tightened closely against flywheel 2 by shear pin 4, whereby a well-defined shearing plane is obtained. This shearing plane is the same plane as contact surface 15. Because the shear pin flange can be tightened closely against flywheel 2 and the shear pin flange 3 thereby does not come to lie in a distorted position (as in the prior art of FIG. 1), no additional bending forces are exerted on shear pin 4.

When shear pin 4 breaks, the shear pin flange 3 can move in axial direction away from flywheel 2 due to the clearance 19. The contact between the flywheel and the shear pin flange 3 is hereby at least greatly reduced such that the connection between central shaft 1 and flywheel 2 is broken.

Contact surface 15 is preferably positioned such that it runs through the centre of the spline connection 5 between the shear pin flange 3 and central shaft 1. The transmission of forces between the shear pin flange 3 and central shaft 1 is typically distributed over the contact zone between the shear pin flange and the central shaft. This contact zone extends over the whole length of the teeth and grooves of the shear pin flange. When a force is visually represented via a vector, this vector originating in the centre of the contact zone between shear pin flange and central shaft. Because the contact surface runs through this centre, a pure transmission can take place over the shearing plane of shear pin 4. No extra torque is hereby exerted on shear pin 4 as a result of a difference in the axial direction 1 in which torque is exerted. This in contrast to the prior art (see FIG. 1), where there is a distance in axial direction between the contact surface and the centre of the contact zone between shear pin flange and central shaft. This distance in the axial direction results in a torque on shear pin 4 when a force is transmitted via a shear pin 4 to a central shaft 1.

Because the flywheel is fixed to the central shaft by first fixing means and the shear pin flange is fixed over central shaft 1 by second fixing means which differ from the first fixing means, the functions of holding the flywheel on the one hand and the connection via a shear pin connection on the other can be separately optimized. Flywheel 2 can thus be optimally secured over the central shaft while the shear pin flange 3 can be placed optimally relative to central shaft 1 and relative to the flywheel in order to obtain an optimal shear pin operation.

The central shaft according to the invention has at least four zones, being a spline zone, screw thread zone, a bearing placing zone and a thickened zone 8. The thickened zone 8 is intended here as stop for the bearings, the bearing zone is provided for placing of the bearings, the screw thread is provided for the purpose of screwing on nut 12 in order to secure the bearings of flywheel 2, and the spline connection is formed to complement teeth and grooves in the central opening of the shear pin flange 3 in order to enable transmission of a rotation movement of the shear pin flange 3 to central shaft 1.

The above described exemplary embodiment is purely illustrative and intended only by way of example. It will be apparent to the skilled person that the means described herein can be replaced with their technical equivalents. Nut 12, which is fastened over screw thread 13, can thus be replaced with a clamp or other fixing means for the purpose of securing bearings 6. Holding ring 17 which engages in groove 16 can also be replaced with an alternative fixing means, such as for instance a nut which is placed over screw thread. These examples will make clear that the invention is not limited to the exemplary embodiments shown in the figures and that the scope of protection is defined solely by the claims.

The invention claimed is:

1. An Agricultural baler, comprising:
 a pressing component;
 a flywheel provided to be driven via a drive shaft, the flywheel is further connected to the pressing component via a central shaft, wherein the flywheel is mounted over the central shaft via intermediate bearings, wherein further mounted on the central shaft is a shear pin flange which is connected via a shear pin to the flywheel for the purpose of transmitting a rotation movement of the flywheel to the central shaft via the shear pin and shear pin flange, wherein the flywheel is held over the central shaft via a first fixing component and the shear pin flange is connected to the central shaft via a second fixing component that differs from the first fixing component, wherein the shear pin flange and the central shaft are connected via a spline connection having teeth and grooves, wherein a clearance is provided between the second fixing component and the shear pin flange, and wherein the teeth and grooves of the spline connection extend in an axial direction of the central shaft to allow a movement of the shear pin flange within the clearance in the axial direction relative to the central shaft.

2. The Agricultural baler of claim 1, wherein the flywheel is positioned on the central shaft between on the one hand a stop provided on the shaft and on the other a nut which engages on the shaft for the purpose of forming a further stop.

3. The Agricultural baler of claim 1, wherein the shear pin flange has an eccentrically placed opening relative to said central shaft for mounting of the shear pin.

4. The Agricultural baler of claim 1, wherein the second fixing component acts as a stop allowing the clearance in the axial direction.

5. The Agricultural baler of claim 1, wherein the shear pin flange has a contact surface provided for a purpose of lying against a surface of the flywheel such that in an assembled position the contact surface lies perpendicularly of the central shaft.

6. The Agricultural baler of claim 5, wherein the contact surface lies in line with a center of an engagement zone between the shear pin flange and the central shaft.

7. The Agricultural baler of claim 4, wherein the second fixing component is formed as a holding ring which engages in a groove of the central shaft thus providing said stop.

* * * * *